W. J., C. R. AND W. P. FRIES.
CULINARY DEVICE.
APPLICATION FILED JUNE 8, 1918.
1,338,129.
Patented Apr. 27, 1920.
2 SHEETS—SHEET 2.
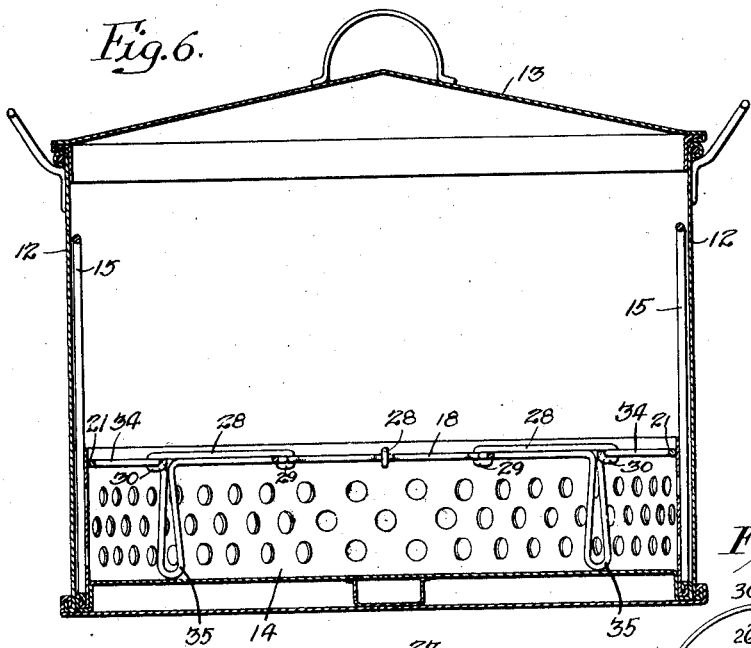
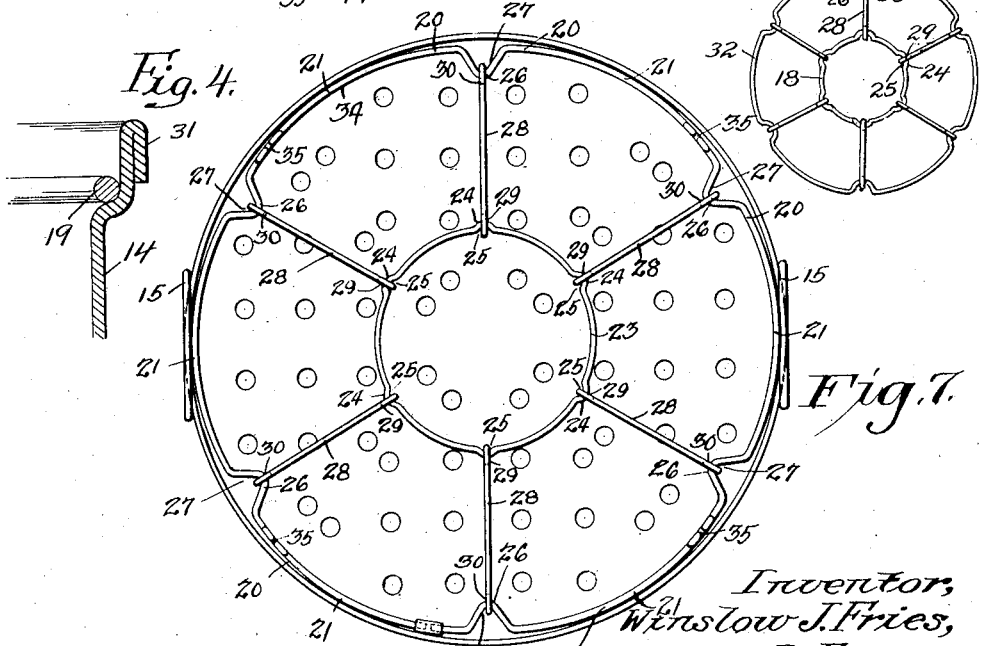

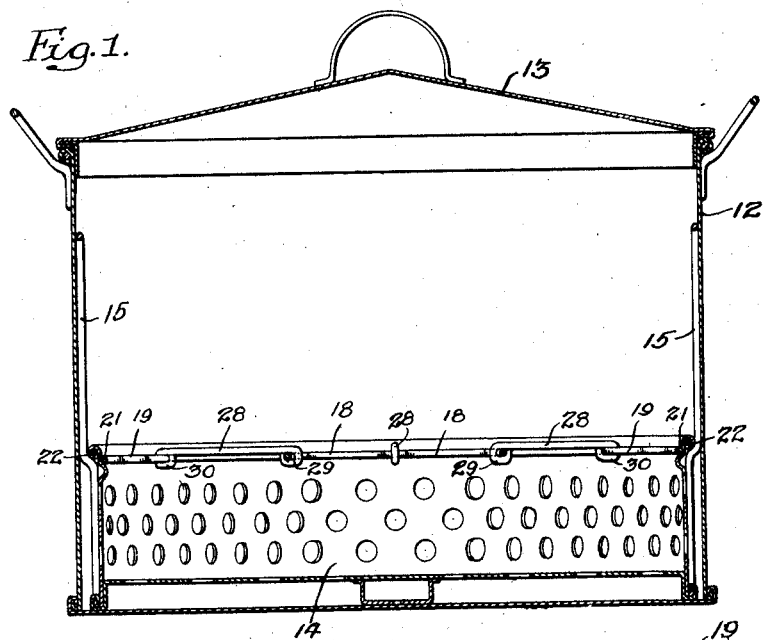
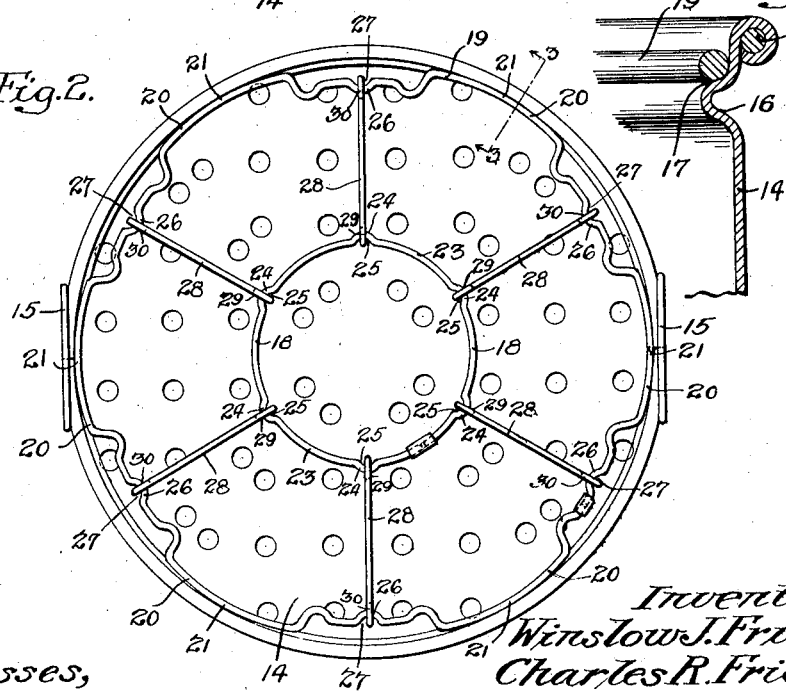

UNITED STATES PATENT OFFICE.

WINSLOW J. FRIES, CHARLES R. FRIES, AND WILLIAM P. FRIES, OF PHILADELPHIA, PENNSYLVANIA.

CULINARY DEVICE.

1,338,129.     Specification of Letters Patent.     Patented Apr. 27, 1920.

Application filed June 8, 1918. Serial No. 238,815.

*To all whom it may concern:*

Be it known that we, WINSLOW J. FRIES, CHARLES R. FRIES, and WILLIAM P. FRIES, citizens of the United States, residing at Philadelphia, in the county of Philadelphia and State of Pennsylvania, have invented certain new and useful Improvements in Culinary Devices, of which the following is a specification.

One object of our invention is to produce an improved culinary device which can be used for preserving vegetables in glass jars or other containers and so that the jars will be kept from striking against each other thereby preventing breakage of the jars.

Another object is to so construct our invention that while the spacing means will serve to prevent the jars from striking together they will permit a slight movement of the jars as may be found necessary from time to time either in the removal of the jars from the device or in the placement of the jars within the device.

Another object is to construct the parts of our invention in such manner that they can be quickly made and assembled and can be easily taken apart.

A still further object is to make the several parts of simple construction so that they can be cheaply manufactured.

These objects, and other advantageous ends which will be described hereinafter, we attain in the following manner, reference being had to the accompanying drawings in which—

Figure 1 is a sectional elevation taken centrally through the device of our invention, Fig. 2 is a top plan view of a tray and spacer which are illustrated in Fig. 1, Fig. 3 is a fragmentary section taken on the line 3—3 of Fig. 2 and drawn on an enlarged scale, Fig. 4 is a fragmentary sectional elevation showing a slightly modified form of our invention, Fig. 5 is a top plan view of another form of spacer forming a part of our invention, Fig. 6 is a view of similar nature to Fig. 1, showing another form of our invention, and Fig. 7 is a top plan view of the spacer and tray shown in Fig. 6.

Referring to Figs. 1 to 3, inclusive, 12 is a kettle which is preferably provided with a lid 13. A perforated tray 14 is adapted to be set within the kettle so as to rest on its bottom and is preferably provided with handles 15 to facilitate the insertion and removal of the tray. The tray, slightly below its top, has an inwardly bent portion 16 which provides a ledge 17 for a spacer 18. This spacer includes a peripheral band 19 which is preferably made of wire and is bent to provide loops 20 which are spaced apart throughout the circumference of the band. These loops are arcuate and are preferably made so that their central portions 21 are located at a slightly greater distance from the center of the spacer than the inner wall of the tray adjacent the top of the ledge 17 so that it is necessary in order to place the spacer on the ledge 17, to apply a slight pressure downwardly upon the spacer 18.

In so doing, the arcuate central portions 21 of the loops will be pressed inwardly toward the center and thereby place a slight tension on the inner wall of the spacer and hold the spacer to the tray against accidental displacement. However, a slight force applied to the spacer will be sufficient to remove the spacer from the tray or to move the spacer circumferentially with respect to the tray.

The upper edge of the tray, as illustrated in Fig. 1, is beaded or turned around a core 22 of wire so that the edge is made comparatively stiff, and after the spacer has been pressed against the ledge 17, the spacer will be firmly held against accidental movement, as above described.

The spacer 18 includes a centrally disposed ring 23 which has bent portions 24 spaced apart to provide internal notches 25. The band 19 between the loops 20 has inwardly bent portions 26 which provide external notches 27. Links 28, preferably made of wire, have eyelets 29 and 30 at their opposite ends which respectively encircle the portions 24 and 26 of the ring 23 and band 19, and the ring 23 is thereby suspended centrally within the space surrounded by the band 19. As shown in Fig. 2, the links 28 are radially disposed so as to provide spaces between them for the insertion of jars (not illustrated) and the ring 23 provides a central space in which another jar can be inserted. Thus the jars are kept from striking each other by the provision of the links 28 and the ring 23.

In the form of our invention shown in Fig. 4, we have illustrated a slightly different form in the top of the tray. Instead of providing a beaded core edge, such for example as shown at 22 in Figs. 1 and 3, we have shown a lip or turned over edge 31. This turned over edge 31 provides a reinforcement for and thereby strengthens the upper edge of the tray. In all other respects the elements shown in Fig. 4 are similar to those described in connection with Figs. 1 to 3, inclusive, and we have, therefore, given corresponding parts similar reference characters.

In Fig. 5 we have shown a slightly modified form of spacer in which the loops 32 which correspond in function to the loops 20 above described, are of greater length than the loops 20 and extend completely to and merge with portions 33 which correspond in function to the portions 26 above described. In all other respects the elements shown in Fig. 5 are similar to those described in connection with Figs. 1 to 4, inclusive, and we have, therefore, given similar parts corresponding reference numerals.

In Figs. 6 and 7 we have shown another modification of the spacer which includes a band 34 having depending loops 35 forming legs. These legs are adapted to rest upon the bottom of the tray 14 instead of on a ledge so that with this construction the tray can be made with a straight side as illustrated. In all other respects the construction is similar to that described in connection with Figs. 1 to 5, inclusive, and we have, therefore, given corresponding parts similar reference numerals.

While we have described our invention as taking a particular form, it will be understood that the various parts of our invention may be changed without departing from the spirit thereof, and hence we do not limit ourselves to the precise construction set forth, but consider that we are at liberty to make such changes and alterations as fairly come within the scope of the appended claims.

Having thus described our invention, what we claim as new and desire to secure by Letters Patent is:

1. A culinary device of the character described including a container for jars, a jar spacer within said container and having an outer band including outwardly projecting loops; an inner ring; and links connecting portions of said band between said loops to the ring; said loops serving to provide frictional engagement with the inner portion of the container whereby the jar spacer is placed under tension and is thereby held firmly to the container; substantially as described.

2. A culinary device of the character described including a container for jars, a jar spacer within said container and having an outer band, said band having indentations whereby outwardly extending loops are provided; an inner ring of smaller diameter than the band and having internal notches; and links connecting the indentations of the band respectively with the internal notches of the ring whereby the ring is maintained within said band and together with said links form spacing members; said loops of the band serving to provide frictional engagement with the inner portion of the container whereby the spacer is placed under tension and is thereby held firmly to the container; substantially as described.

3. A culinary device of the character described including a jar holding tray having a ledge; a kettle in which the tray is inserted; and a jar spacer resting on said ledge and having loops in frictional engagement with the inner wall of said tray whereby the spacer is placed under tension to firmly hold it relatively to the tray; substantially as described.

4. A culinary device of the character described including a jar holding tray having an internal ledge pressed therein; a kettle into which the tray is adapted to be inserted; and a jar spacer resting upon said ledge and having a band including outwardly pressed loops in engagement with the inner surface of said tray above said ledge, substantially as described.

In testimony whereof we have signed our names to this specification in the presence of two subscribing witnesses.

WINSLOW J. FRIES.
CHARLES R. FRIES.
WILLIAM P. FRIES.

Witnesses:
GEORGE R. DALRYMPLE.
LILY VOORHEES.